(12) United States Patent
Yoskovits et al.

(10) Patent No.: US 11,687,405 B2
(45) Date of Patent: Jun. 27, 2023

(54) CENTRALIZED SRAM ERROR LOCATION DETECTION AND RECOVERY MECHANISM

(71) Applicant: Western Digital Technologies, Inc., San Jose, CA (US)

(72) Inventors: Yuval Yoskovits, Beer Sheva (IL); Yan Dumchin, Beer Sheva (IL); Ishai Ilani, Dolev (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/539,800

(22) Filed: Dec. 1, 2021

(65) Prior Publication Data
US 2023/0168964 A1    Jun. 1, 2023

(51) Int. Cl.
*G06F 11/10* (2006.01)
(52) U.S. Cl.
CPC ................ *G06F 11/1044* (2013.01)
(58) Field of Classification Search
CPC .................................................. G06F 11/1044
See application file for complete search history.

(56) References Cited

U.S. PATENT DOCUMENTS

| | | | |
|---|---|---|---|
| 6,662,333 B1 | 12/2003 | Zhang et al. | |
| 7,085,971 B2 | 8/2006 | Barth, Jr. et al. | |
| 7,539,926 B1 | 5/2009 | Lesea | |
| 8,429,498 B1 * | 4/2013 | Anholt | G06F 11/1048 714/764 |
| 8,839,054 B2 | 9/2014 | Braceras et al. | |
| 10,437,666 B2 | 10/2019 | Engin et al. | |
| 11,126,498 B2 | 9/2021 | Schaefer et al. | |
| 2008/0215953 A1 * | 9/2008 | Deierling | H03M 13/17 714/759 |
| 2010/0223525 A1 * | 9/2010 | Wuu | H03M 13/2927 714/755 |
| 2014/0258805 A1 * | 9/2014 | Casado | H03M 13/35 714/758 |
| 2015/0363262 A1 * | 12/2015 | Hu | G06F 11/1048 714/773 |
| 2017/0123896 A1 * | 5/2017 | Baek | G06F 11/1076 |
| 2018/0276093 A1 * | 9/2018 | Kapoor | G11C 29/52 |

(Continued)

OTHER PUBLICATIONS

International Search Report and Written Opinion for International Application No. PCT/US2022/029505 dated Oct. 7, 2022.

*Primary Examiner* — Joseph O Schell
(74) *Attorney, Agent, or Firm* — Patterson + Sheridan, LLP; Steven H. VerSteeg

(57) ABSTRACT

A data storage device includes two or more memory devices and a controller coupled to the two or more memory devices. The controller is configured to program data to one or more memory devices of the two or more memory devices, select one or more of the one or more memory devices to have additional ECC for the data of the one or more memory devices, program the additional ECC to a first memory device. The data is programmed with error correction code (ECC). The first memory device is distinct from the one or more memory devices. The first memory device is disposed in a central module, where the central module includes additional decoding capability. The additional ECC and the corresponding data with ECC are concatenated and decoded for additional error correction capability.

17 Claims, 5 Drawing Sheets

(56) References Cited

U.S. PATENT DOCUMENTS

| | | |
|---|---|---|
| 2020/0127685 A1* | 4/2020 | Chen ..................... G11C 29/52 |
| 2021/0081278 A1 | 3/2021 | Seo et al. |
| 2021/0089389 A1 | 3/2021 | Kaynak et al. |
| 2021/0089394 A1* | 3/2021 | Yu ..................... G06F 11/1068 |
| 2021/0124642 A1 | 4/2021 | Kim et al. |
| 2021/0157675 A1 | 5/2021 | Kim |

\* cited by examiner

CENTRALIZED SRAM ERROR LOCATION DETECTION AND RECOVERY MECHANISM

BACKGROUND OF THE DISCLOSURE

Field of the Disclosure

Embodiments of the present disclosure generally relate to data storage devices, such as solid state drives (SSDs), and, more specifically, providing for increased error correction capabilities.

Description of the Related Art

Volatile memory devices, such as static random access memory (SRAM) and dynamic random access memory (DRAM), may be used to save data that is needed for the operation of the data storage device. For example, the SRAM may store data needed for the operation of one or more hardware blocks of an application-specific integrated circuit (ASIC) controller of the data storage device. SRAM may be susceptible to bit flips (bit errors) due to physical or electrical phenomena.

In order to protect data stored in the SRAM, error correction code (ECC), such as single-error-correction double-error-detection (SECDED) code, may be used. When data is scheduled to be programmed to SRAM, some redundant bits (parity bits) are concatenated with the data to generate an ECC codeword to be written to the SRAM. When the concatenated data is read from the SRAM, the redundant bits are used to detect and correct bit errors found. SECDED code may detect up to two bit errors and correct one bit error without hinders. SECDED code may provide information regarding problematic memory addresses that cause double bit errors, but may not provide an accurate position of the two bit flips. In order to provide an accurate position of the two bit flips, other ECC codewords with double-error-correction capability may be used. However, more redundant bits may be required. Thus, the size of the ECC codeword may be increased leading to either less available SRAM storage space or requiring increased SRAM capacity. The additional redundant bits may also reduce maximum operational frequency as the decoding time may be increased.

Therefore, there is a need in the art for an improved double-error-correction in the data storage device.

SUMMARY OF THE DISCLOSURE

The present disclosure generally relates to data storage devices, such as solid state drives (SSDs), and, more specifically, providing for increased error correction capabilities. A data storage device includes two or more memory devices and a controller coupled to the two or more memory devices. The controller is configured to program data to one or more memory devices of the two or more memory devices, select one or more of the one or more memory devices to have additional ECC for the data of the one or more memory devices, program the additional ECC to a first memory device. The data is programmed with error correction code (ECC). The first memory device is distinct from the one or more memory devices. The first memory device is disposed in a central module, where the central module includes additional decoding capability. The additional ECC and the corresponding data with ECC are concatenated and decoded for additional error correction capability.

In one embodiment, a data storage device includes two or more memory devices and a controller coupled to the two or more memory devices. The controller is configured to program data to one or more memory devices of the two or more memory devices, where the data is programmed with error correction code (ECC), select one or more of the one or more memory devices to have additional ECC for the data of the one or more memory devices, program the additional ECC to a first memory device, where the first memory device is distinct from the one or more memory devices.

In another embodiment, a data storage device includes two or more memory devices and a controller coupled to the two or more memory devices. The controller is configured to determine that one or more memory devices of the two or more memory devices needs additional error correction code (ECC), where data programmed to the one or more memory devices includes ECC, and program the additional ECC to a first memory device disposed in a central module, where the first memory device is distinct from the two or more memory devices, and where the two or more memory devices are coupled to the central module.

In another embodiment, a data storage device includes memory means and a controller coupled to the memory means. The controller includes a first volatile memory, where the first volatile memory is distinct from the memory means, and where the first volatile memory is configured to store first error correction code (ECC), and a second volatile memory disposed in a central module, where the second volatile memory is distinct from the first volatile memory and the memory means, where the second volatile memory is configured to store second ECC, and where the second ECC is additional ECC for the first volatile memory.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure present disclosure generally relates to data storage devices, such as solid state drives (SSDs), and, more specifically, providing for increased error correction capabilities. A data storage device includes two or more memory devices and a controller coupled to the two or more memory devices. The controller is configured to program data to one or more memory devices of the two or more memory devices, select one or more of the one or more memory devices to have additional ECC for the data of the one or more memory devices, program the additional ECC to a first memory device. The data is programmed with error correction code (ECC). The first memory device is distinct from the one or more memory devices. The first memory device is disposed in a central module, where the central module includes additional decoding capability. The additional ECC and the corresponding data with ECC are concatenated and decoded for additional error correction capability.

Figure 1:
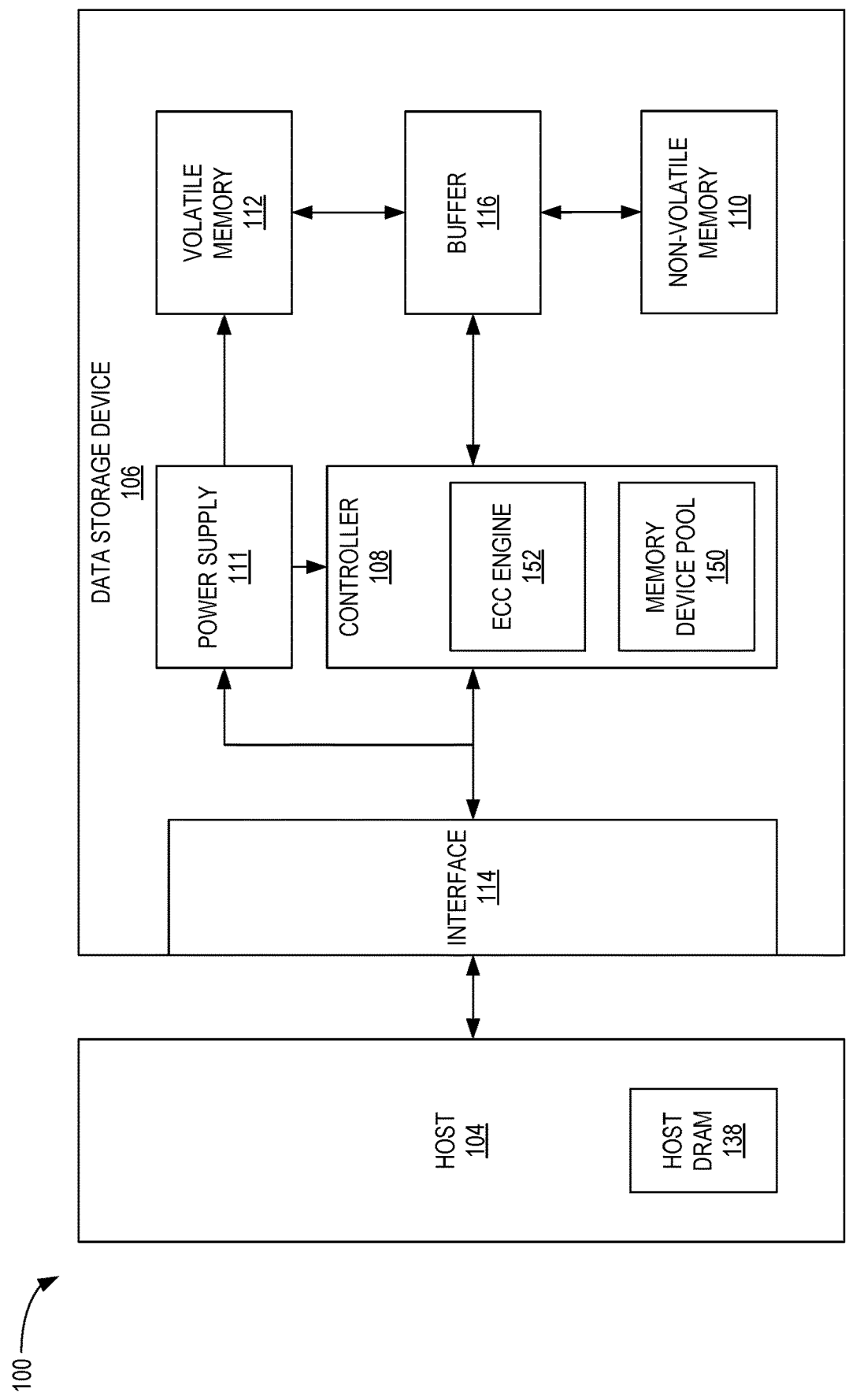
FIG. 1 is a schematic block diagram illustrating a storage system in which a data storage device may function as a storage device for a host device, according to certain embodiments.

FIG. 1 is a schematic block diagram illustrating a storage system 100 in which a host device 104 is in communication with a data storage device 106, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, the interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 includes a memory device pool 150, which may include one or more memory devices. In one embodiment, the memory device pool 150 includes one or more SRAM devices. The memory device pool 150 may be coupled to each hardware block of the controller 108, such that one or more of the memory devices are coupled to each hardware block of the controller 108. The controller 108 also includes an ECC engine 152 for calculating ECCs. The memory device pool 150 may store data, such as ECC data and the like. The ECC engine 152 may include a first encoder/decoder unit to generate and decode the ECC data. In some examples, the ECC data is SECDED parity.

Figure 2:
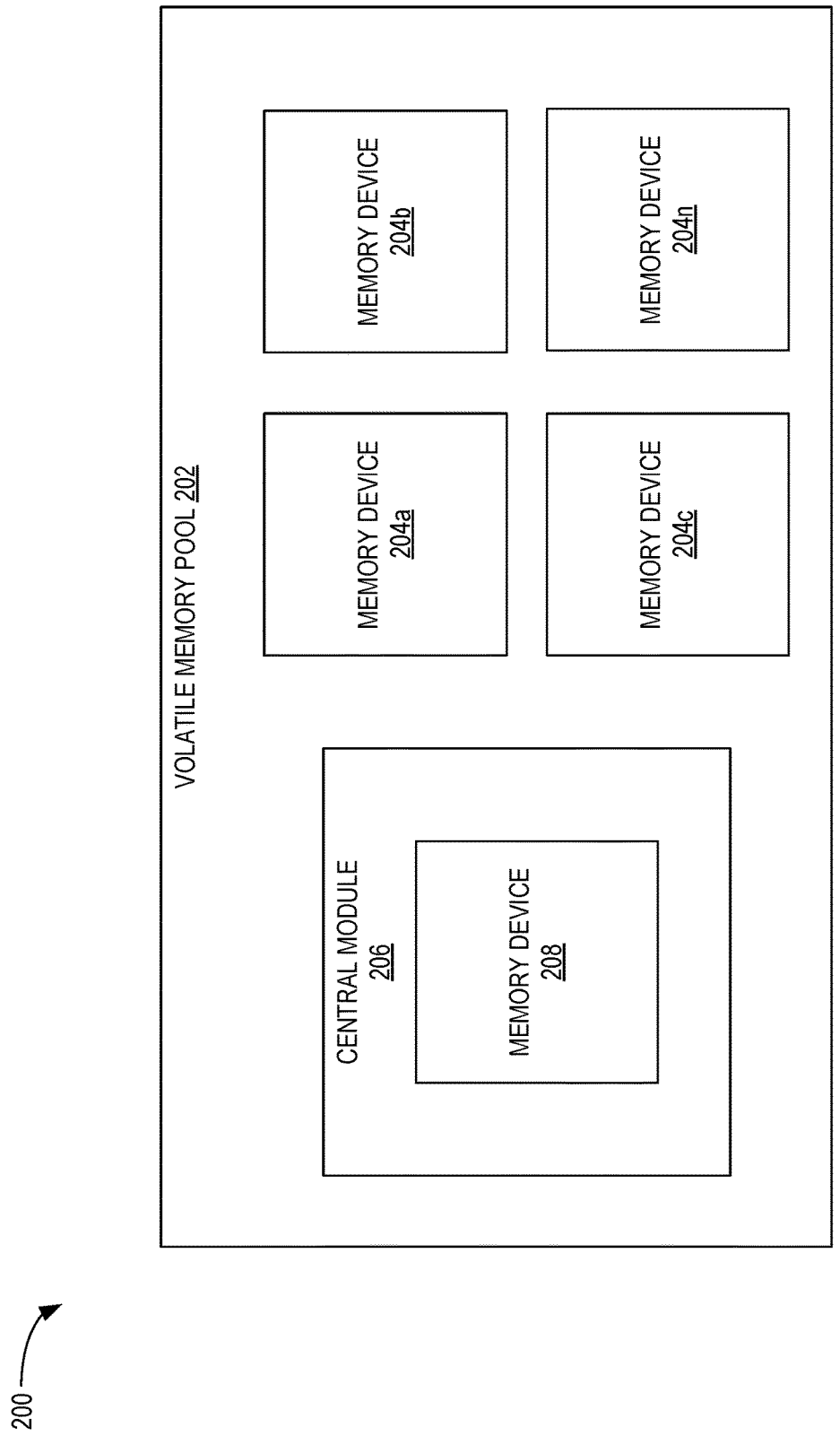
FIG. 2 is a schematic block diagram of a volatile memory pool, according to certain embodiments.

FIG. 2 is a schematic block diagram of a volatile memory pool 202, according to certain embodiments. The volatile memory pool 202 may be the memory device pool 150 of FIG. 1. The volatile memory pool 202 includes one or more memory devices 204a-204n, which may be SRAM devices, and a central module 206. The central module 206 includes a memory device 208, which may be a SRAM device. In some examples the central module 206 includes more than one memory device. It is to be understood that the shown number of the one or more memory devices 204a-204n is not intended to be limiting, but to provide an example of a possible embodiment. The central module 206 may further include a second encoder/decoder unit that is able to generate and decode extra parity for detecting and correcting additional bit errors. The second encoder/decoder unit may be configured to decode concatenated data that includes data, SECDED parity, and extra parity. The first encoder/decoder unit described above may be configured to decode data programmed with SECDED parity.

The memory device 208 may store additional parity bits for a specific memory device of the one or more memory devices 204a-204n. In some examples, the memory device 208 may store additional parity bits for two or more memory devices of the one or more memory devices 204a-204n. When data is programmed to the one or more memory devices 204a-204n, ECC parity, such as SECDED parity, is programed with the data programmed to the one or more memory devices 204a-204n. Thus, the stored data in the one or more memory devices 204a-204n is concatenated with SECDED parity.

A controller, such as the controller 108 of FIG. 1, may determine that one (or more) of the one or more memory devices 204a-204n requires additional parity. The determination may be based on a health statistic of the one (or more) of the one or more memory devices 204a-204n. For example, the health statistic may be based on one or more of the following: detecting a repetition of bit flips in decoded data from a memory device of the one or more memory devices 204a-204n, a program erase cycle (PEC) count of a memory device of the one or more memory devices 204a-204n, and an input/output frequency of a memory device of the one or more memory devices 204a-204n. Based on the determining, the controller 108 may generate additional or extra parity for the data being written to the selected memory and store the generated parity in the memory device 208. In some examples, the controller 108 may generate extra parity for one or more wordlines of the one or more memory devices 204a-204n and store the generated extra parity in the memory device 208. Thus, using the extra parity and the data associated with the extra parity including the SECDED of the data, an accurate location of two bit errors may be found and corrected.

Figure 3:
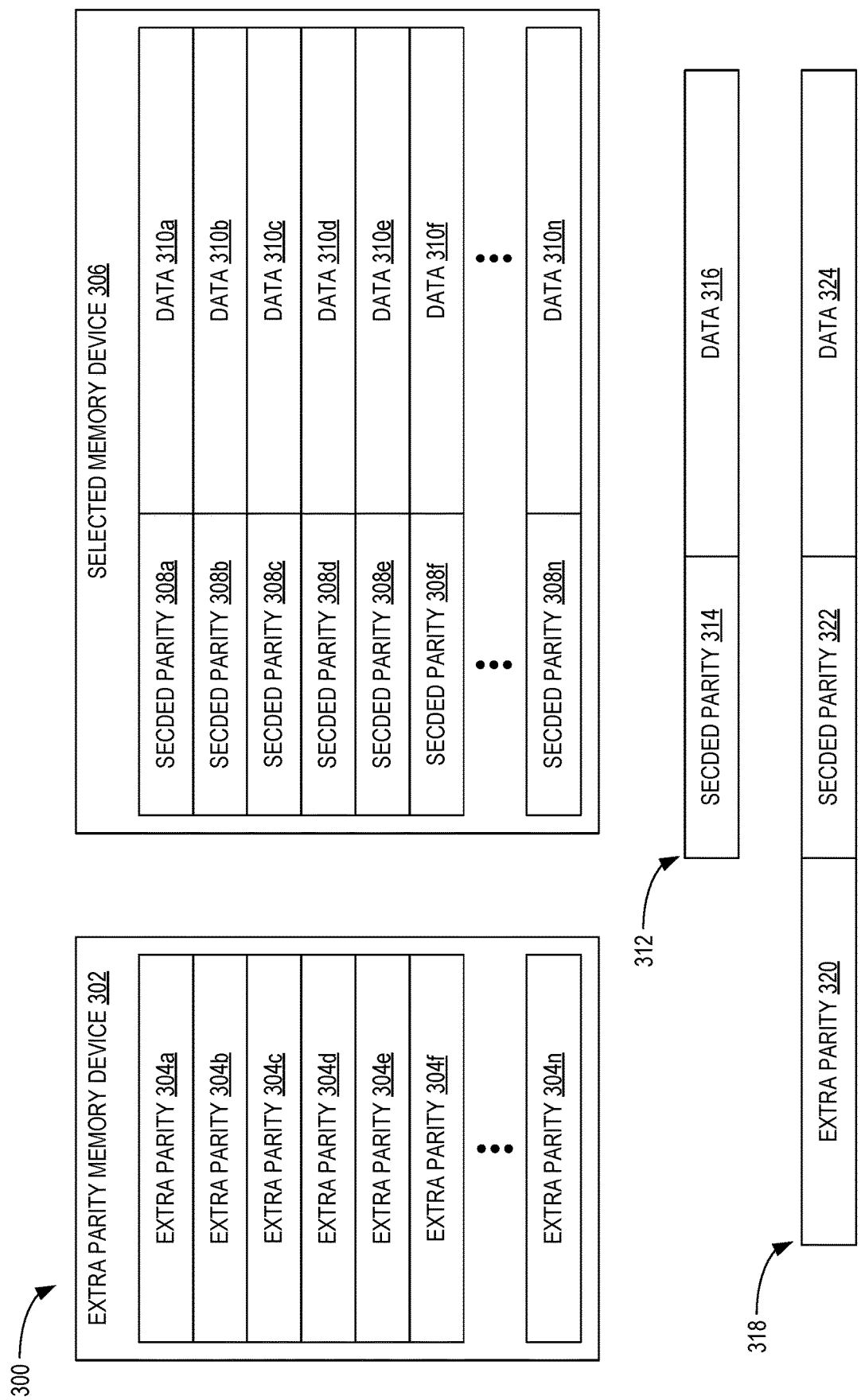
FIG. 3 is an illustration of data distribution across an extra parity memory device and a selected memory device, according to certain embodiments.

FIG. 3 is an illustration of data distribution 300 across an extra parity memory device 302 and a selected memory device 306, according to certain embodiments. The extra parity memory device 302 may be the memory device 208 of FIG. 2 and the selected memory device 306 may be one of the one or more memory devices 204a-204n of FIG. 2. In some examples, the extra parity memory devices 302 may store extra parity for two or more of the one or more memory devices 204a-204n or extra parity for one or more wordlines of the one or more memory devices 204a-204n.

The extra parity memory device 302 includes one or more extra parity 304a-304n. The selected memory device 306 includes one or more data 310a-310n, each concatenated with one of one or more SECDED parity 308a-308n. Each of the one or more extra parity 304a-304n is associated with one of the one or more data 310a-310n. For example, first extra parity 304a is associated with a first data 310a that is concatenated with a first SECDED parity 308a.

When data is being read from a memory device that does not have extra parity stored in the extra parity memory device 302, the data and the associated SECDED parity is read from the memory device. For example, codeword 312 may be an example of a codeword including data 316 and SECDED parity 314. Because codeword 312 only includes SECDED parity 314, one bit error may be corrected even though two bit errors are detected. However, if the data is being read from the selected memory device 306, the associated extra parity is read from the extra parity memory device 302. For example, additional protection codeword 318 may be an example of a concatenated codeword including extra parity 320, SECDED parity 322, and data 324. The extra parity 320 is concatenated with the SECDED parity 322 and the data 324 before being decoded. Therefore, two bit errors may be detected and the two bit errors may be corrected. It is to be understood that the number of bit errors corrected and detected is not intended to be limiting, but to provide an example of a possible embodiment. Furthermore, other ECC data is contemplated and may be applicable to the described embodiments.

Figure 4:
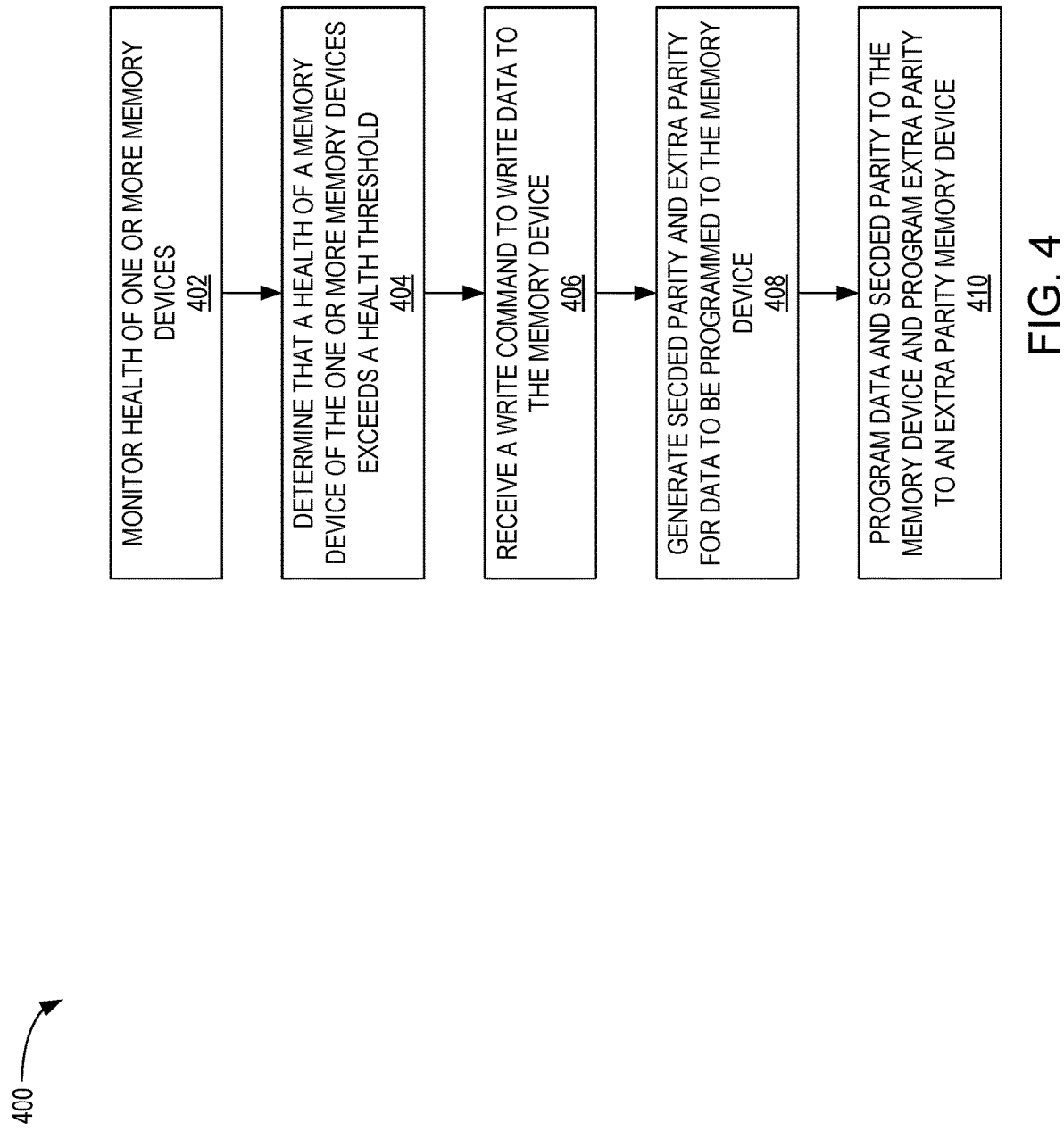
FIG. 4 is a flow diagram illustrating a method of determining to store extra parity in an extra parity memory device for a memory device, according to certain embodiments.

FIG. 4 is a flow diagram illustrating a method 400 of determining to store extra parity in an extra parity memory device, such as the extra parity memory device 302 of FIG. 3, for a memory device, such as the selected memory device 306 of FIG. 3, according to certain embodiments. Method 400 may be executed by a controller, such as the controller 108 of FIG. 1.

At block 402, the controller 108 monitors the health of one or more memory devices, such as the one or more memory devices 204a-204n of FIG. 2. The one or more memory devices may be SRAM devices. The health of the one or more memory devices may be based on one or more of the following: detecting a repetition of bit flips in decoded data from a memory device of the one or more memory devices 204a-204n, a program erase cycle (PEC) count of a memory device of the one or more memory devices 204a-204n, and an input/output frequency of a memory device of the one or more memory devices 204a-204n.

At block 404, the controller 108 determines that a health of a memory device (e.g., the selected memory device 306 of FIG. 3) of the one or more memory devices 204a-204n exceeds a health threshold. Exceeding the health threshold may indicate that the memory device may require additional protection against bit errors or bit flips. At block 406, the controller 108 receives a write command to write data to the selected memory device 306. At block 408, the controller 108 generates SECDED parity and extra parity for the data to be programmed to the selected memory device 306. At block 410, the controller 108 concatenates the SECDED parity and the data, programs the concatenated data to the selected memory device 306, and programs the extra parity to the extra parity memory device 302.

Figure 5:
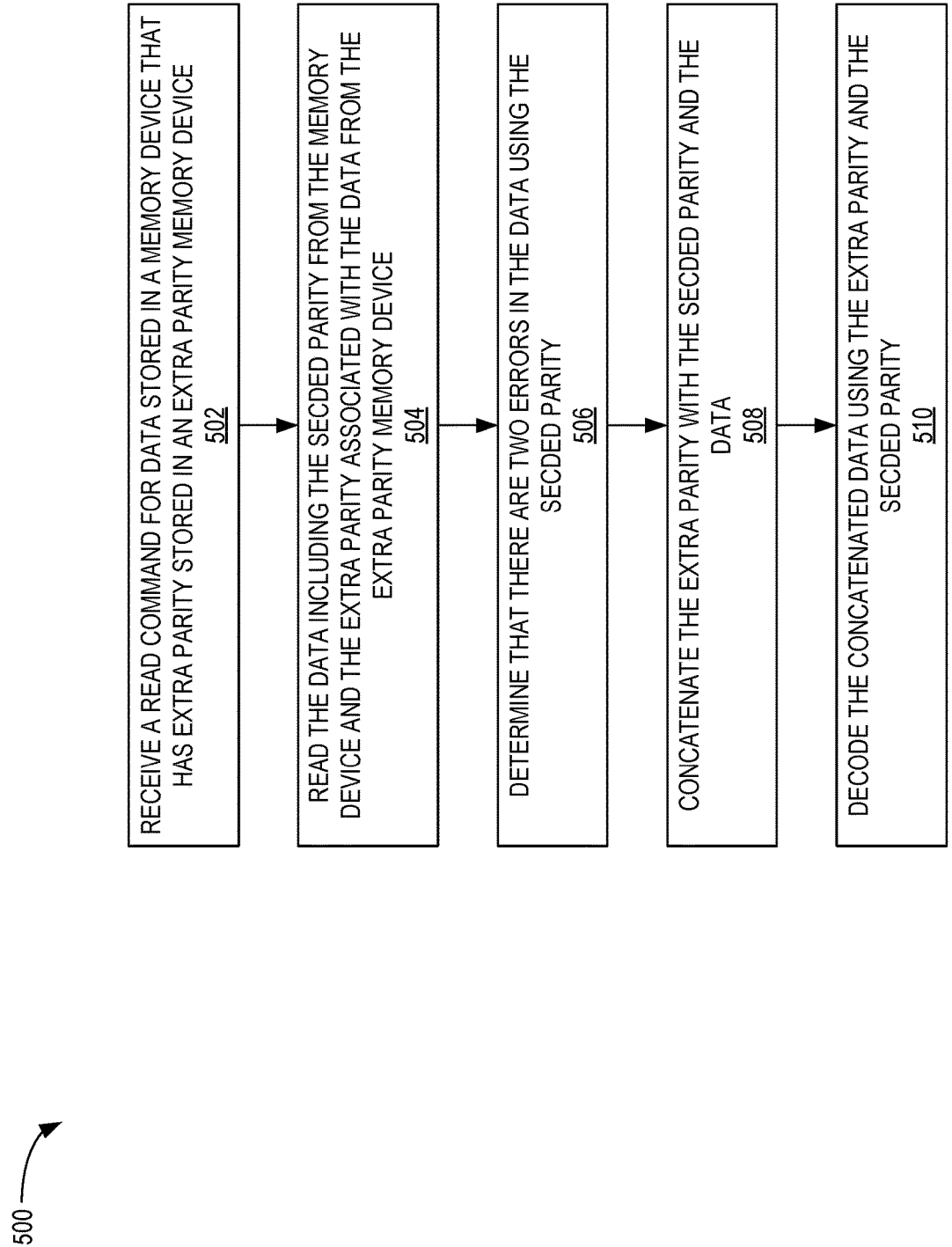
FIG. 5 is a flow diagram illustrating a method of using extra parity in an extra parity memory device for relevant data stored in a memory device associated with a read command, according to certain embodiments.

FIG. 5 is a flow diagram illustrating a method 500 of using extra parity in an extra parity memory device, such as the extra parity memory device 302 of FIG. 3, for relevant data stored in a memory device, such as the selected memory device 306 of FIG. 3, associated with a read command, according to certain embodiments. Method 500 may be executed by a controller, such as the controller 108 of FIG. 1.

At block 502, the controller 108 receives a read command for data stored in the selected memory device 306, where data stored in the selected memory device 306 has extra parity stored in the extra parity memory device 302. At block 504, the controller 108 reads the data including the SECDED parity associated with the read command from the selected memory device 306 and the relevant extra parity from the extra parity memory device 302. At block 506, the controller 108 determines that there are two errors in the data associated with the read command using the SECDED parity. At block 508, the controller 108 concatenates the relevant extra parity with the concatenated SECDED parity and the data read from the selected memory device 306. At block 510, the controller 108 decodes the concatenated data using the extra parity and the SECDED parity.

By decoding the data with both the extra parity and the SECDED parity, more than one bit error, such as two bit errors, may be located and fixed. Furthermore, by having a dedicated memory device for the extra parity and determining which memory devices requires extra parity, overall performance of the data storage device may be increased.

In one embodiment, a data storage device includes two or more memory devices and a controller coupled to the two or more memory devices. The controller is configured to program data to one or more memory devices of the two or more memory devices, where the data is programmed with error correction code (ECC), select one or more of the one or more memory devices to have additional ECC for the data of the one or more memory devices, program the additional ECC to a first memory device, where the first memory device is distinct from the one or more memory devices.

The data storage device further includes a first decoder and a second decoder, where the first decoder is configured to decode the data programmed with the ECC, and where the second decoder is configured to decode the data programmed with the ECC and the additional ECC. The ECC is single-error-correction double-error-detection (SECDED) code. The additional ECC is parity data. Each of the two or more memory devices is static random access memory (SRAM). The first memory device contains the additional ECC for one memory device of the two or more memory devices. The additional ECC is for an entirety of the one memory device. The first memory device includes the additional ECC for an additional memory device of the two or more memory devices. The additional ECC is for less than an entirety of one memory device. The additional ECC is for less than an entirety of the two or more memory devices.

In another embodiment, a data storage device includes two or more memory devices and a controller coupled to the two or more memory devices. The controller is configured to determine that one or more memory devices of the two or more memory devices needs additional error correction code (ECC), where data programmed to the one or more memory devices includes ECC, and program the additional ECC to a first memory device disposed in a central module, where the first memory device is distinct from the two or more memory devices, and where the two or more memory devices are coupled to the central module.

The determining is based on detecting a repetition of bit flips in decoded data from the one or more memory devices. The determining is based on a program erase cycle (PEC) count of the one or more memory devices. The determining is based on an input/output frequency of the one or more memory devices. The controller is further configured to retrieve the programmed data including the ECC from the one or more memory devices, retrieve the additional ECC from the first memory device corresponding to the retrieved data, concatenate the retrieved programmed data including the ECC and the retrieved additional ECC to generate concatenated data, and decode the concatenated data. The ECC is single-error-correction double-error-detection (SECDED) code. The additional ECC is generated based on the controller detecting that the programmed data has two errors using the SECDED code. The two or more memory devices and the first memory device are volatile memory devices.

In another embodiment, a data storage device includes memory means and a controller coupled to the memory means. The controller includes a first volatile memory, where the first volatile memory is distinct from the memory means, and where the first volatile memory is configured to store first error correction code (ECC), and a second volatile memory disposed in a central module, where the second volatile memory is distinct from the first volatile memory and the memory means, where the second volatile memory is configured to store second ECC, and where the second ECC is additional ECC for the first volatile memory.

The controller is configured to determine that the first volatile memory requires the additional ECC based on one or more of a detecting a repetition of bit flips in decoded data from the first volatile memory, a program erase cycle (PEC) count of the first volatile memory, and an input/output frequency of the first volatile memory. The second ECC combined with the first ECC is sufficient to correct two bit flips.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
    two or more memory devices; and
    a controller coupled to the two or more memory devices, wherein the controller is configured to:
        program data to one or more memory devices of the two or more memory devices, wherein the data is programmed with error correction code (ECC), wherein the ECC is single-error-correction double-error-detection (SECDED) code;
        select one or more of the one or more memory devices to have additional ECC for the data of the one or more memory devices, wherein the additional ECC is parity data; and
        program the additional ECC to a first memory device, wherein the first memory device is distinct from the one or more memory devices, and wherein the additional ECC is generated based on the controller detecting that the programmed data has two errors using the SECDED code.

2. The data storage device of claim 1, further comprising a first decoder and a second decoder, wherein the first decoder is configured to decode the data programmed with the ECC, and wherein the second decoder is configured to decode the data programmed with the ECC and the additional ECC.

3. The data storage device of claim 1, wherein each of the two or more memory devices is static random access memory (SRAM).

4. The data storage device of claim 1, wherein the first memory device contains the additional ECC for one memory device of the two or more memory devices.

5. The data storage device of claim 4, wherein the additional ECC is for an entirety of the one memory device.

6. The data storage device of claim 4, wherein the first memory device includes the additional ECC for an additional memory device of the two or more memory devices.

7. The data storage device of claim 1, wherein the additional ECC is for less than an entirety of one memory device.

8. The data storage device of claim 1, wherein the additional ECC is for less than an entirety of the two or more memory devices.

9. A data storage device, comprising:
    two or more memory devices; and
    a controller coupled to the two or more memory devices, wherein the controller is configured to:
        determine that one or more memory devices of the two or more memory devices needs additional error correction code (ECC), wherein:
            data programmed to the one or more memory devices includes ECC;
            the ECC is single-error-correction double-error-detection (SECDED) code;
            the additional ECC is parity data; and
            the additional ECC is generated based on the controller detecting that the programmed data has two errors using the SECDED code; and
        program the additional ECC to a first memory device disposed in a central module, wherein the first memory device is distinct from the two or more memory devices, and wherein the two or more memory devices are coupled to the central module.

10. The data storage device of claim 9, wherein the determining is based on detecting a repetition of bit flips in decoded data from the one or more memory devices.

11. The data storage device of claim 9, wherein the determining is based on a program erase cycle (PEC) count of the one or more memory devices.

12. The data storage device of claim 9, wherein the determining is based on an input/output frequency of the one or more memory devices.

13. The data storage device of claim 9, wherein the controller is further configured to:
    retrieve the programmed data including the ECC from the one or more memory devices;
    retrieve the additional ECC from the first memory device corresponding to the retrieved data;
    concatenate the retrieved programmed data including the ECC and the retrieved additional ECC to generate concatenated data; and
    decode the concatenated data.

14. The data storage device of claim 9, wherein the two or more memory devices and the first memory device are volatile memory devices.

15. A data storage device, comprising:
    memory means; and
    a controller coupled to the memory means, wherein the controller comprises:

a first volatile memory, wherein:
  the first volatile memory is distinct from the memory means;
  the first volatile memory is configured to store first error correction code (ECC); and
  the first ECC is single-error-correction double-error-detection (SECDED) code; and
a second volatile memory disposed in a central module, wherein:
  the second volatile memory is distinct from the first volatile memory and the memory means;
  the second volatile memory is configured to store second ECC;
  the second ECC is additional ECC for the first volatile memory;
  the additional ECC is parity data; and
  the additional ECC is generated based on the controller detecting that data programmed to the memory means has two errors using the SECDED code.

16. The data storage device of claim 15, the controller is configured to determine that the first volatile memory requires the additional ECC based on one or more of a detecting a repetition of bit flips in decoded data from the first volatile memory, a program erase cycle (PEC) count of the first volatile memory, and an input/output frequency of the first volatile memory.

17. The data storage device of claim 15, wherein the second ECC combined with the first ECC is sufficient to correct two bit flips.

* * * * *